(12) United States Patent
Brunswig et al.

(10) Patent No.: US 8,132,119 B2
(45) Date of Patent: Mar. 6, 2012

(54) PRIORITY CONTROLLED DISPLAY

(75) Inventors: Frank Brunswig, Heidelberg (DE); Uwe Bloching, Nussloch (DE)

(73) Assignee: SAP AG, Walldorf (DE)

( * ) Notice: Subject to any disclaimer, the term of this patent is extended or adjusted under 35 U.S.C. 154(b) by 1103 days.

(21) Appl. No.: 11/639,812

(22) Filed: Dec. 14, 2006

(65) Prior Publication Data
US 2008/0148166 A1 Jun. 19, 2008

(51) Int. Cl.
*G06F 3/048* (2006.01)
*G06F 17/30* (2006.01)

(52) U.S. Cl. .................. 715/802; 715/822; 707/807

(58) Field of Classification Search ............... 715/234, 715/794, 797, 798, 700; 370/412; 707/805, 707/807
See application file for complete search history.

(56) References Cited

U.S. PATENT DOCUMENTS

| | | | |
|---|---|---|---|
| 4,954,818 A * | 9/1990 | Nakane et al. ............ | 715/790 |
| 7,010,546 B1 * | 3/2006 | Kolawa et al. ............ | 707/694 |
| 7,756,907 B2 * | 7/2010 | Stolte et al. ............. | 707/805 |
| 2004/0070627 A1 * | 4/2004 | Shahine et al. ........... | 345/794 |
| 2005/0060665 A1 * | 3/2005 | Rekimoto ................ | 715/810 |
| 2006/0069808 A1 * | 3/2006 | Mitchell et al. .......... | 709/246 |
| 2006/0161635 A1 * | 7/2006 | Lamkin et al. ............ | 709/217 |
| 2006/0236233 A1 * | 10/2006 | Ozawa et al. ............. | 715/517 |
| 2006/0265413 A1 * | 11/2006 | Blencowe ................ | 707/102 |
| 2007/0047697 A1 * | 3/2007 | Drewry et al. ............ | 379/88.13 |
| 2007/0118548 A1 * | 5/2007 | Carapella et al. ......... | 707/101 |
| 2007/0136654 A1 * | 6/2007 | Peters ................... | 715/509 |
| 2007/0276857 A1 * | 11/2007 | Fujio et al. ............... | 707/102 |

* cited by examiner

*Primary Examiner* — Dang Ton
*Assistant Examiner* — Ryan Kavleski
(74) *Attorney, Agent, or Firm* — Mintz, Levin, Cohn, Ferris, Glovsky & Popeo, P.C.

(57) ABSTRACT

Methods and apparatus, including computer program products, are provided for priority-controlled displays. In one aspect, the information elements are received at a user interface. Priorities are determined for the information elements. The information elements and determined priorities are then provided to the user interface. The priorities include a first priority representing one of the information elements with a higher priority, the information element having the first priority formatted to display the information element with higher priority when compared to another information element having a lower determined priority than the first priority.

15 Claims, 5 Drawing Sheets

620

Sales Order Overview

| Sales Order # | Customer | Value | Status | Status Information |
|---|---|---|---|---|
| | | | | |
| 4711 | Miller & Co | 27.000 $ | | |
| 9624 | Fruit Company | 42.000 $ | Production of valve MDR-42 will be delayd by 7 days. The reason is that production capacity has been exhausted. | |
| 5694 | Car Company | 37.000 $ | | |

632  634  636  638  640  660

220

Sales Order Overview

| Sa (232) | Cus (234) | V | Status (238) | Status Information (240) |
|---|---|---|---|---|
| 47 | Mill | 2 | Very Cr | The following parts are missing: 3 valves and 250 screws |
| 96 | Fru | 4 | Critical | Production of valve MDR-42 willbe delayd by 7 days. The ... |
| 56 | Car | 3 | Critical | Supplier Smith & CO has problem delivering gasoline pumps |

| Column name | Priority |
|---|---|
| Sales Order # | 1 |
| Customer | 3 |
| Value | 1 |
| Status | 98 |
| Status information | 99 |

Sales Order Overview

| Sales Order # | Customer | Value | Status | Status Information |
|---|---|---|---|---|
| | | | | |
| 4711 | Miller & Co | 27.000 $ | Very Critical | The following parts are ... |
| 9624 | Fruit Company | 42.000 $ | Critical | Production of valve MDR- ... |
| 5694 | Car Company | 37.000 & | Critical | Supplier Smith & CO has ... |

432 — Sales Order #
434 — Customer
436 — Value
438 — Status
440 — Status Information

Sales Order Overview

| Sales Order # /632 | Customer /634 | Value /636 | Status /638 | Status Information /640 |
|---|---|---|---|---|
| 4711 | Miller & Co | 27.000 $ | | |
| 9624 | Fruit Company | 42.000 $ | Production of valve MDR-42 will be delayd by 7 days. The reason is that production capacity has been exhausted. | /660 |
| 5694 | Car Company | 37.000 & | | |

FIG. 6

PRIORITY CONTROLLED DISPLAY

FIELD

The present disclosure generally relates to data processing. More particularly, the present disclosure relates to priority controlled display of information within a user interface.

BACKGROUND

Computers often include user interfaces designed to present information to a user in a manner dictated by the user interface or the program providing the information to the user interface. For example, a database program may provide information to a user interface for display, but the database program may dictate the manner in which the information is displayed to a user. The database program may also dictate how that information is displayed by specifying the number of rows and columns displayed as well as specifying their height and width. An approach that displays information based solely on the dictates of the program may not adequately respond to the needs of a user relying on the displayed information. The challenge of properly presenting information becomes more acute when the display area of a user interface is constrained to, for example, a single, fixed window.

SUMMARY

The subject matter disclosed herein provides methods and apparatus, including computer program products, for providing a priority controlled display.

In one aspect, the information elements are received at a user interface. Priorities are determined for the information elements. The information elements and determined priorities are then provided to the user interface. The priorities include a first priority representing one of the information elements with a higher priority, the information element having the first priority formatted to display the information element with higher priority when compared to another information element having a lower determined priority than the first priority.

Variations may include one or more of the following features. The information elements received at a user interface may be formatted as a table including a first column and a second column. The table may have a fixed size. The column width of the first column associated with the information element having the first priority may be increased, while the column width of the second column associated with another information element having a lower priority than the first priority may be decreased to maintain the fixed sized of the table.

Moreover, the information element with highest priority may be displayed to show the complete contents of the information element. The text in the information element may be displayed using a font or a font color different from the other information elements. Moreover, the information element with the highest priority may be displayed in a larger column width than other information elements. The information element with the highest priority may also be displayed in a window separate from other information elements. Moreover, when a user selects a row including the information element, a window is displayed with the information element having the highest priority than the other priorities.

The priorities may be defined by a user at the user interface or may be defined by a program providing the information elements to the user interface.

The subject matter described herein may be implemented to realize the advantage of enabling a user of a user interface to readily determine high priority information without having to take additional action, such as adjusting column width or hiding less important columns.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed embodiments. In the drawings.

FIG. 2 depicts an example of a priority controlled display;

FIG. 3 depicts a priority scheme;

FIG. 4 depicts a display presented without regard to the priority scheme;

FIG. 6 depicts another example of a priority controlled display.

DETAILED DESCRIPTION

The implementations set forth in the following description do not represent all implementations consistent with the subject matter described herein. Instead, they are merely some examples consistent with certain aspects related to the described subject matter. Wherever possible, the same reference numbers will be used throughout the drawings to refer to the same or like parts.

Figure 1:
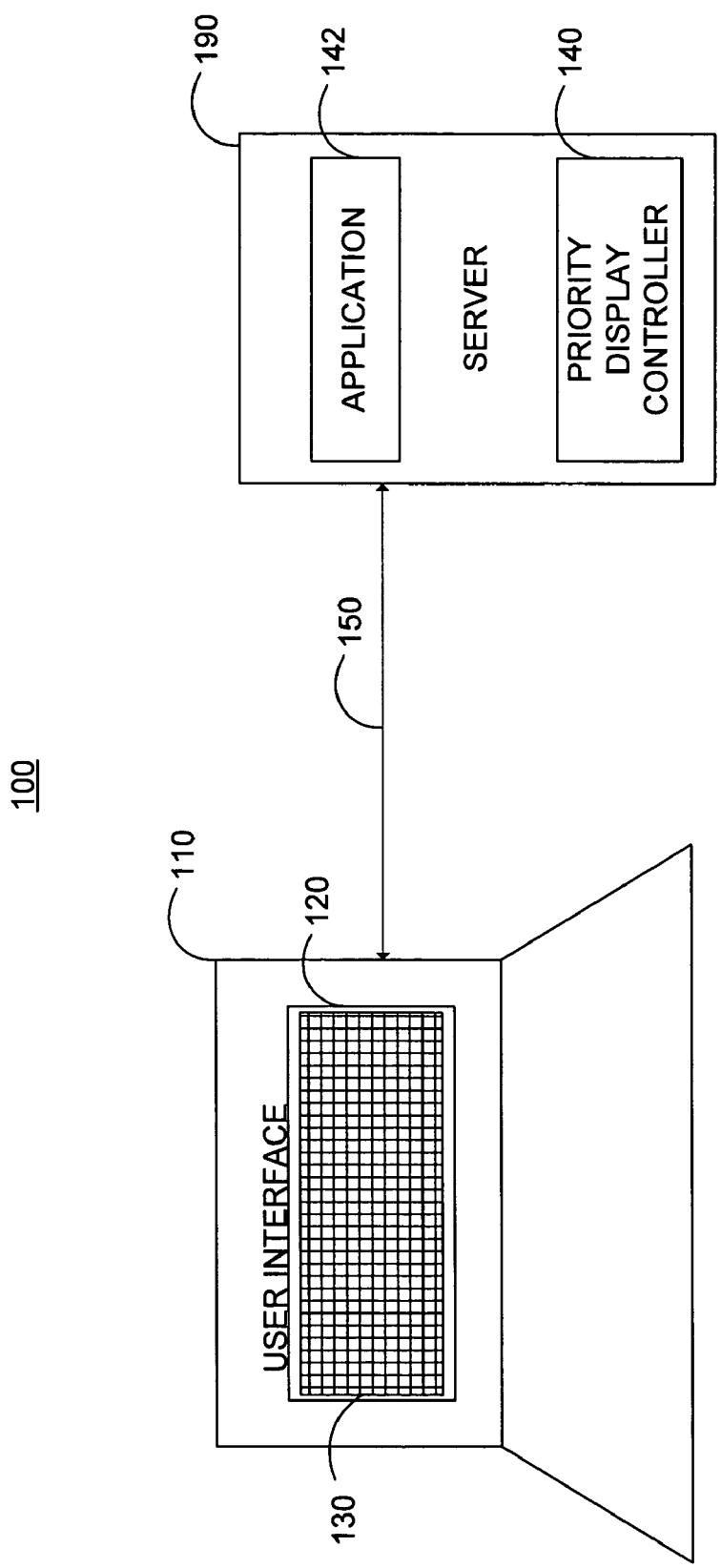
FIG. 1 depicts a block diagram of a system implementing a priority controlled display.

FIG. 1 depicts a system 100 capable of providing a priority controlled display. Referring to FIG. 1, system 100 includes a processor, such as a computer 110, a user interface 120, and information 130 rendered within user interface 120. The information 130 may be provided by (or retrieved from) an application 142 at a processor, such as server 190, through communication link 150. The server 190 may also include a priority display controller 140 for controlling the rendering of information 130, so that information 130 is rendered and thus displayed based on a priority scheme. Moreover, the priority scheme may define which portions (i.e., elements) of the information have a higher priority than other portions, so that when information 130 is rendered and displayed, the higher priority portions of information are given a higher priority for rendering and thus display. Furthermore, the priority scheme used by priority display controller 140 may be predetermined during the design of application 142 or user interface 120. Alternatively, the priority scheme used by priority display controller 140 may be selectable by user interface 120 (e.g., by a user through user interface 120).

In some implementations, user interface 120 includes a restricted display area (e.g., a fixed window size). When that is the case, the use of priority display controller 140 and the corresponding priority scheme for portions of information 130 enables rendering and displaying of the highest priority portions of information 130, so that a user at user interface 120 can readily view those high priority portions of information 130.

In some implementations, user interface 120 receives information 130 from application 142 in table form (e.g., information formatted in rows and columns). FIG. 2 depicts an example of a table 220 for a sales order overview. The sales order overview table 220 includes the following columns: sales order number 232, customer identification 234, value 236, status 238, and status information 240. In this example, sales order overview table 220 was rendered in a restricted display area (e.g., a fixed width of 600 pixels and a fixed height of 200 pixels or in 100% of the available display region) of user interface 120. Moreover, sales order overview table 220 may be rendered based on a priority scheme used by priority display controller 140. Specifically, priority display controller 140 may determine, using the priority scheme, the priority for each of the information elements, which in this example corresponds to columns 232-240.

FIG. 3 depicts an example of a priority scheme 300. The priority scheme 300 may be stored in a configuration database or other suitable storage mechanism and may be assigned anytime, such as during the design of user interface 120, design of application 142, or during runtime (execution) of application 142. The priority scheme 300 lists the following priorities for columns 232-240: sales order number has a priority of 1; customer identification has a priority of 3; value has a priority of 1; status has a priority of 98; and status information has a priority of 99. In this example, priority display controller 140 determines that status information has the highest priority of "99" followed by status with a value of "98." Accordingly, when sales order information 220 is rendered as information 130 in the restricted display region of user interface 120, status information 240 would be displayed with higher priority, so that a user may readily determine the information contained in the high priority information element (in this example, the status information column 240).

Referring again to FIG. 2, status information 240 has the highest priority and thus is rendered with the widest column to enable a user of user interface 120 to readily determine the contents of that column. Similarly, status column 238, with the second highest priority, is depicted with sufficient width to enable the user to readily determine the contents of column 238. In contrast, sales order number column 232 and value column 236 are the lowest priority columns, and, as such, priority display controller 140 displays those columns with less regard for the display of the information in those columns. For example, the value column 236 is truncated, so that a user would be required to take additional actions to obtain information for that column.

Without the use of the priority display controller 140 and priority scheme 300, user interface 120 would display the sales order overview table as depicted in FIG. 4. Referring to FIG. 4, the sales order overview table 420 includes the following columns: sales order number 432, customer identification 434, value 436, status 438, and status information 440. Although sales order overview table 420 includes the same columns as sales order overview table 220, priority display controller 140 has not applied a priority scheme to the columns of sales order overview table 420. As a consequence, the columns of sales order overview table 420 are rendered and thus displayed in user interface 120 without regard to the priority of the information in sales order overview table 420. In this example, if status information 440 were the highest priority information in sales order overview table 420, a user of user interface 120 would not be able to readily determine the contents of that column. A user would be required to take additional actions to determine the contents of that high priority column (e.g., make an additional request for information, re-render the column, extend the window to a maximum size (if allowed), manually enlarge the size of column with a mouse (if allowed), or manually change the layout of the table by hiding the display of other columns). In implementations where the high priority column 440 represents mission critical information, those additional steps may waste time and consume processing resources, when compared to the use of priority display controller 140 and priority scheme 300 to render table 220 and status information 240 (FIG. 2).

Referring again to FIG. 1, user interface 120 may be implemented as any interface that enables a user to interact with an application or program, such as application 142. The user interface 120 may be implemented as a browser, such as Netscape Navigator or the like, or any other type of graphical user interface. In some implementations, SAP Web Dynpro (commercially available from SAP AG, Walldorf, Germany) may be used as a model-based development environment for generating user interface 120, although other development environments may be used.

Moreover, user interface 120 may include one or more windows (i.e., display regions) for presenting information from one or more applications or programs. In some cases, a display region of a window may be restricted to a predetermined size, such as a fixed height and width (e.g., 500 pixels width and 200 pixel height) or a fixed percentage. In some implementations, user interface 120 receives information 130 formatted in a descriptor language, such as HTML (hypertext markup language). HTML defines the structure and layout of the information using tags and attributes, and a portion of the HTML would be an example of an information element.

The user interface 120 may interact with application 142 at server 190 over a communication link 150. Communication link 150 may be any type of communications mechanism and may include, alone or in any suitable combination, a telephony-based network, a local area network (LAN), a wide area network (WAN), a dedicated intranet, wireless LAN, the Internet, an intranet, a wireless network, a bus, or any other communication mechanisms. Further, any suitable combination of wired and/or wireless components and systems may provide communication link 150. Moreover, communication link 150 may be embodied using bi-directional, unidirectional, or dedicated communication links. Communication link 150 may also implement standard transmission protocols, such as Transmission Control Protocol/Internet Protocol (TCP/IP), Hyper Text Transfer Protocol (HTTP), SOAP, RPC, or other protocols.

Server system 190 may include one or more processors, such as computers, to interface with other computers, such as computer 110, and/or programs, such as user interface 120. The application 142 may be implemented as a program or group of programs. In some implementations, application 142 may be designed for end-users, such as a database application, although other programs may be used.

The priority display controller 140 may be implemented as a program or as a component, i.e., a small binary object (e.g., an applet) or program that performs a specific function and is designed in such a way to easily operate with other components and programs. In some implementations, priority display controller 140 determines the priority of information being rendered for display at a user interface. Although FIG. 1 depicts priority display controller 140 at server 190, priority display controller 140 may be located at other locations and in multiple locations. For example, the priority display controller 140 may be a component, such as a plug-in, of user interface 120.

Figure 5:
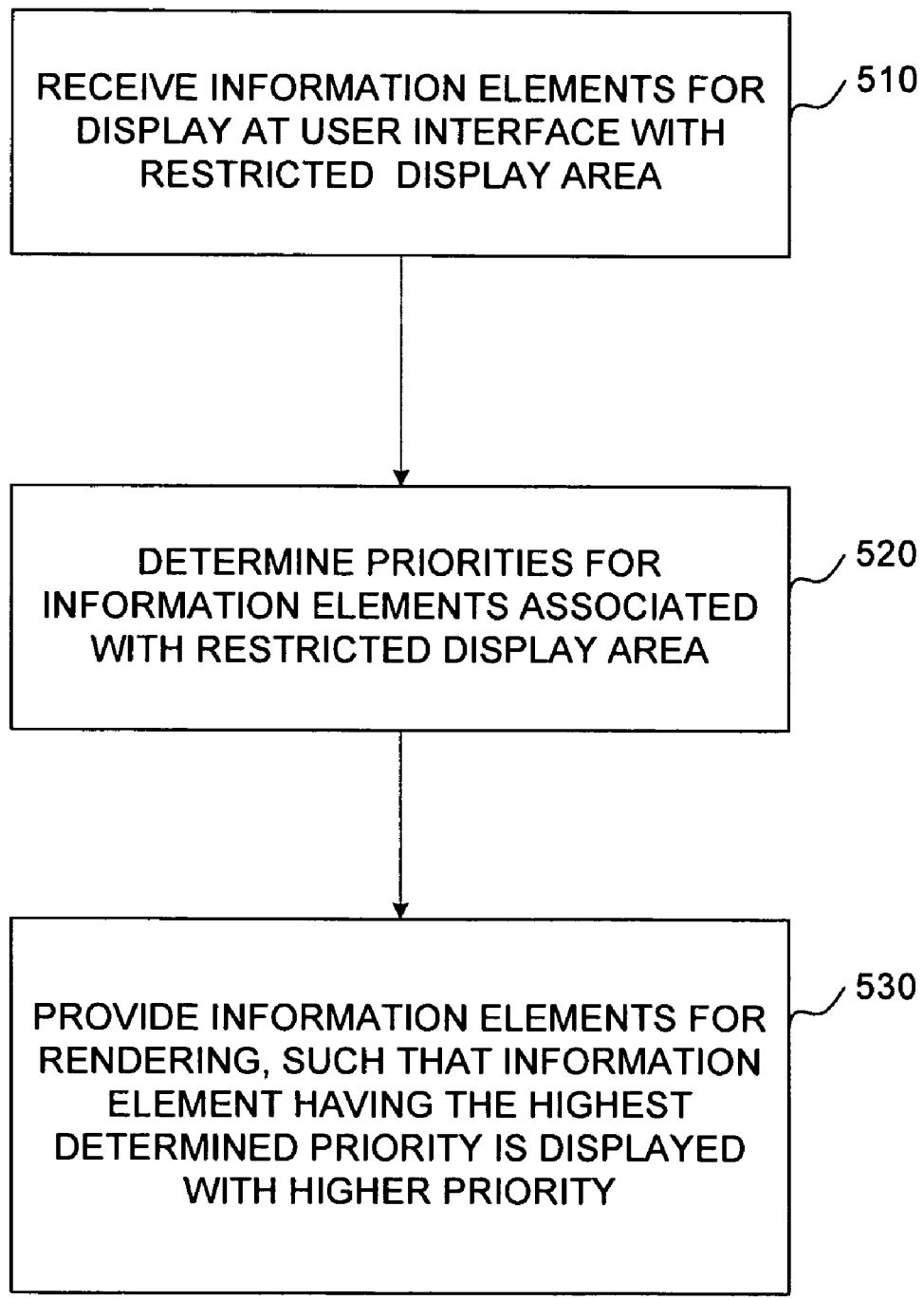
FIG. 5 depicts a flowchart for displaying information using a priority controlled display.

FIG. 5 depicts an exemplary flowchart for providing information using priority scheme 300 and priority display controller 140. The priority display controller 140 may first receive information for display at user interface 120 having a constrained display area (block 510). For example, priority display controller 140 may receive an HTML document of a table having rows and columns.

Next, priority display controller 140 may use priority scheme 300 to determine the priority of the information (block 520). For example, priority display controller 140 may receive the HTML document, including HTML tags identifying columns 432-440 (FIG. 4) and a corresponding priority scheme 300 for those columns. When that is the case, the columns are determined to have the following priorities: status information 99, status 98, customer 3, value 1, and sales order 1. In this example, status information has the highest priority for display with a value of 99. Although the examples described herein depict a priority scheme having 99 as the highest priority, other schemes may be used. For example, a value 1 or a character value of "A" or "Z" may instead be considered the highest priority.

The priority display controller 140 may then provide to user interface 120 information formatted in HTML with a corresponding style sheet that represents the priorities determined by priority display controller 140, such that the information (e.g., status information 99) is rendered by user interface 120 to enable a user to readily determine the information in that high priority column (block 530). For example, the user interface 120 may receive an HTML table of information and style information representative of the priorities of the columns in the table, so that user interface 120 may render the table as depicted in FIG. 2.

Although the highest priority information may be displayed with a greater column width when compared to lower priority information, other approaches may be used to enable user interface to render and thus display the high priority information in a manner that allows a user to readily determine that high priority information. FIG. 6 depicts an implementation where the highest priority information is depicted in a separate window, such as a box 660. The table 620 is similar to table 420. However, unlike table 420, as a user scrolls down the rows of table 620, the column with the highest priority, as determined by priority display controller 140 and priority scheme 300, is shown in a separate window, such as a box 660—highlighting thus the highest priority information element to a user. Although FIG. 6 depicts box 660 as a separate window, other forms of a separate window may be used, such as bubbles, pop-ups windows, and the like. Moreover, the highest priority information may also be subject to other forms of emphasis, such as changing font color, changing font size, and other audio and visual indications.

Although FIG. 1 is described with respect to a client-server architecture, system 100 can also use any other architecture or framework. Moreover, although FIG. 1 shows a single computer 110 and a single server system 130, a plurality of computers and servers may be used. Moreover, the elements depicted in FIG. 1 may be distributed among multiple locations. Furthermore, when the above description refers to a "user," the user may be a person or a processor, such as a computer or program.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A computer-implemented method comprising:
receiving, at a priority display controller implemented on a processor from a database, a table for display at a user interface that comprises a restricted display area, the table comprising a first column of the database that comprises first related information elements and a second column of the database that comprises second related information elements;
determining, by the priority display controller using a priority scheme, that the first column has a first priority, the second column has a second priority, and the first priority is higher than the second priority;
rendering the table in the user interface, the rendering comprising displaying all of the first related information elements in the first column according to a first format that indicates that the first priority of the first column is higher than the second priority of the second column and such that contents of the first related information elements in the first column are readily determinable by a user viewing the user interface without requiring the user to take additional actions; and
displaying contents of one of the first related information elements in the first column in a window overlaying the table.

2. The computer-implemented method of claim 1, wherein the rendering further comprises:
increasing a first width of the first column; and
decreasing a second width of the second column to display the table within the restricted display area.

3. The computer-implemented method of claim 2, wherein the increasing the first width provides a complete display within the restricted display area of the contents of the first related information elements in the first column.

4. The computer-implemented method of claim 1, wherein the formatting of the first column further comprises:
   displaying the contents of first related information elements in the first column using a font or a font color different from the second related information elements in the second column.

5. The computer-implemented method of claim 1, further comprising:
   receiving the first and the second priorities defined by the user at the user interface.

6. The computer-implemented method of claim 1, further comprising:
   receiving the first priority and the second priority defined by a program providing the table to the user interface, the program comprising the database.

7. The computer-implemented method of claim 1, wherein the first related information elements and the second related information elements each comprise a portion of information provided by a program to the user interface, the table being provided in a format including a plurality of rows and a plurality of columns, the plurality of columns including the first column and the second column, each information element being associated with one of the rows and one of the columns, the method further comprising, when a user selects a row of the plurality of rows, displaying the window overlaying the table, the window displaying full contents of the one of the first related information elements that lies in the row, the one of the first related information elements corresponding to the first column.

8. A non-transitory computer-readable medium storing instructions to configure a processor to perform operations comprising:
   receiving, at a priority display controller implemented on a processor from a database, a table for display at a user interface that comprises a restricted display area, the table comprising a first column of the database that comprises first related information elements and a second column of the database that comprises second related information elements;
   determining, by the priority display controller using a priority scheme, that the first column has a first priority, the second column has a second priority, and the first priority is higher than the second priority;
   rendering the table in the user interface, the rendering comprising displaying the first related information elements in the first column according to a first format that indicates that the first priority of the first column is higher than the second priority of the second column and such that contents of the first related information elements in the first column are readily determinable by a user viewing the user interface without requiring the user to take additional actions; and displaying contents of one of the first related information elements in the first column in a window overlaying the table.

9. The computer-readable medium of claim 8, wherein the rendering further comprises;
   increasing a first width of the first column; and
   decreasing a second width of the second column to display the table within the restricted display area.

10. The computer-readable medium of claim 8, wherein the increasing the first width provides a complete display within the restricted display area of the contents of the first related information elements in the first column.

11. The computer-readable medium of claim 10, wherein the formatting of the first column further comprises:
   displaying the contents of first related information elements in the first column using a font or a font color different from the second related information elements in the second column.

12. The computer-readable medium of claim 8, wherein the operations further comprise;
   receiving the first and the second priorities defined by the user at the user interface.

13. The computer-readable medium of claim 8, wherein the operations further comprise;
   receiving the first priority and the second priority defined by a program providing the table to the user interface, the program comprising the database.

14. The computer-readable medium of claim 8, wherein the plurality of information elements each comprise a portion of information provided by a program to the user interface, the information provided in a format including a plurality of rows and a plurality of columns, the plurality of columns including the first column and the second column, each information element being associated with one of the rows and one of the columns, the rendering further comprising, when a user selects a row of the plurality of rows, displaying the window overlaying the table such that the window displays full contents of the one of the first related information elements that lies in the row, the one of the first related information elements corresponding to the first column associated with the first priority.

15. A system comprising:
   a processor; and
   a memory, wherein the processor and the memory are configured to perform operations comprising:
   receiving, at a priority display controller from a database, a table for display at a user interface that comprises a restricted display area, the table comprising a first column of the database that comprises first related information elements and a second column of the database that comprises second related information elements;
   determining, by the priority display controller using a priority scheme, that the first column has a first priority, the second column has a second priority, and the first priority is higher than the second priority;
   rendering the table in the user interface, the rendering comprising displaying all of the first related information elements in the first column according to a first format that indicates that the first priority of the first column is higher than the second priority of the second column and such that contents of the first related information elements in the first column are readily determinable by a user viewing the user interface without requiring the user to take additional actions; wherein the rendering further comprises:
   increasing a first width of the first column; and decreasing a second width of the second column to display the table within the restricted display area; and
   displaying contents of one of the first related information elements in the first column in a window overlaying the table.

* * * * *